US005536978A

United States Patent [19]

Cooper et al.

[11] Patent Number: 5,536,978

[45] Date of Patent: Jul. 16, 1996

[54] NET CURRENT CONTROL DEVICE

[75] Inventors: John H. Cooper, Murrysville; David W. Fugate, Cabot; Fred M. Dietrich, Saxonburg, all of Pa.

[73] Assignee: Electric Power Research Institute, Inc., Palo Alto, Calif.

[21] Appl. No.: 332,914

[22] Filed: Nov. 1, 1994

[51] Int. Cl.[6] .......... H04B 3/30

[52] U.S. Cl. .......... 307/89; 307/90; 307/91; 361/56; 361/159; 333/12

[58] Field of Search .......... 307/89, 91, 17, 307/104, 90; 361/56, 159

[56] References Cited

U.S. PATENT DOCUMENTS

| | | | |
|---|---|---|---|
| 687,141 | 11/1901 | Everest . | |
| 1,752,320 | 4/1930 | White . | |
| 1,915,442 | 6/1933 | Nyquist . | |
| 4,371,742 | 2/1983 | Manly | 174/36 |
| 4,885,555 | 12/1989 | Palmer | 333/12 |
| 4,958,134 | 9/1990 | Sawa et al. | 333/12 |
| 4,964,012 | 10/1990 | Kitagawa | 361/113 |
| 4,964,013 | 10/1990 | Kitagawa | 361/113 |
| 4,970,476 | 11/1990 | Kitagawa | 333/12 |
| 4,972,167 | 11/1990 | Fujioka | 336/92 |
| 4,983,932 | 1/1991 | Kitagawa | 333/12 |
| 5,003,278 | 3/1991 | May | 336/92 |
| 5,070,441 | 12/1991 | Ashley | 363/154 |
| 5,091,707 | 2/1992 | Wollmerschauser et al. | 333/12 |
| 5,175,442 | 12/1992 | Ashley | 307/91 |
| 5,200,730 | 4/1993 | Masuda et al. | 336/90 |
| 5,264,814 | 11/1993 | Yamazaki et al. | 336/65 |
| 5,287,074 | 2/1994 | Meguro et al. | 333/12 |
| 5,291,172 | 3/1994 | Ito et al. | 336/65 |
| 5,360,998 | 11/1994 | Walling | 307/91 |
| 5,365,115 | 11/1994 | Kalyon | 307/89 |

*Primary Examiner*—William M. Shoop, Jr.
*Assistant Examiner*—Albert W. Paladini
*Attorney, Agent, or Firm*—Leonard Bloom

[57] ABSTRACT

In an electrical power system for a residential building, a multi-conductor cable supplies power to loads in the residential building from a power supply. A net current returning from loads to the power supply via alternative conductive paths different from the neutral conductor in the cable creates a magnetic field in the vicinity of and inside of the residential building. A net current control device, including a ferromagnetic core, is attached to the multi-conductor cable in order to increase the impedance of the alternate conductive paths to the net current and to increase the net current flowing along the neutral conductor. Various modifications of the net current control device are disclosed.

18 Claims, 5 Drawing Sheets

NET CURRENT CONTROL DEVICE

FIELD OF THE INVENTION

The present invention relates to improvements to electrical systems of residential buildings, and more particularly, to improvements which reduce power frequency magnetic fields in the vicinity of and within residential buildings.

BACKGROUND OF THE INVENTION

Service cables that deliver power to residential buildings from a power supply typically include a neutral conductor which provides a return path for the electric current to the power supply; the power supply is usually a utility transformer within an electric distribution system. When a portion of the power frequency (60 Hz) electric current returns to the utility transformer via paths other than the neutral conductor, a net current is created in the service cable and the alternate current path in the building. Net current is defined as the instantaneous sum of all of the currents that are flowing in an electrical conductor (or group of electrical conductors) forming the service cable. As described in EPRI Report EL-6509 "Pilot Study of Residential Power Frequency Magnetic Fields", the net current is one of the primary causes of power frequency magnetic fields in residential buildings. Net currents in residences typically range from zero amperes to as much as ten amperes. Results from the EPRI Report TR-102759-VI "Survey of Residential Magnetic Field Sources", show that the median home in its study had magnetic fields that exceeded 1.2 mG in homes with metallic water lines and 0.5 mG in homes with plastic water lines in the center of the room with the highest field. This is based on the level that is exceeded 5% of the time during the 24-hour measurement period.

Net current on the cables supplying current has been a long-standing situation. It is only recently that the general public has become aware of possible health effects from exposure to electric and magnetic fields (EMF). Although substantial questions remain about the possible health effects of power frequency magnetic fields, the public is interested in eliminating or reducing their exposure to the fields. It may be desirable, therefore, to eliminate, or at least to reduce, these fields inside of and in the vicinity of the buildings to which the electrical power is supplied. Since net currents mostly are the sources of these magnetic fields, it would be desirable to provide a means for controlling these net currents.

In the communication and data transmission arts, as distinguished from power transmission, it is well known to surround an electric cable with a ferrite or other magnetic substance of different cylindrical or rectangular shapes to reduce high frequency noise on the electrical cable. Noise suppression devices (or noise absorbers) are disclosed, for instance, in U.S. Pat. Nos. 5,003,278, 5,200,730 and 5,864,814. These devices are formed from a ferromagnetic material and are attached around the electric cable to suppress electric noise that is generated within an electronic device or that enters the electronic device from outside through the electric cable. The cables, which use this type of product on data transmission electronic circuits, usually process frequencies from computer sources. This is an altogether different purpose from that of the present invention.

Attempts were made in the art of power transmission for reducing currents induced in the sheath or other metallic coverings of cables carrying alternating or pulsating currents. This sheath current, in addition to the losses in transmission it causes, has an appreciable effect on the heating of the cable; hence reduces the permissible current in the conductor. In order that these sheath currents may be reduced and at the same time to permit the grounding of the cable, U.S. Pat. No. 1,752,320 discloses cores of magnetizable material provided with properly designed coils placed in proximity to the cable, so as to be magnetized by currents flowing in the conductors of the cable. The coil, or winding, of the core is capable of producing an electromotive force and is connected in such a manner as to reduce or, if desired, to neutralize the effect of the electromotive force induced in any specified length of sheath.

In order to obtain a balance between the sheath electromotive force and the electromotive force induced in the winding or coil, the number of turns in the coil are varied, or an air gap in the magnetic circuit is provided, or the dimensions of the core itself are varied, or the position of the core and coil with respect to the cable is altered.

However, none of these prior art technologies concerned reducing a power magnetic field in the vicinity and within residential buildings by controlling net current flowing in conductors of electrical systems of residential buildings and by keeping the sum of instantaneous current is flowing in all conductors of the cable equal to zero.

There have been recent attempts to minimize net currents in the service entrance cables caused by currents returning to the power system via the grounding connection to the metallic water pipe in residential homes. These attempts have been undertaken by some people to reduce net currents in the electric service cable and plumbing because of concerns that increased magnetic fields in their home might possibly be detrimental to their health. The most common approach to reducing net currents has been to install an electrically insulating pipe coupling in the water pipe outside of the house, as for example, at the shut off valve at the edge of the property. Insulating couplings for this application are commercially available. The primary disadvantage of this approach is that it increases the electrical impedance between grounding connection in the house back to the electrical supply system and may result in an increased shock hazard.

SUMMARY OF THE INVENTION

It is, therefore, the object of the present invention to provide a safe means for reducing magnetic fields in the vicinity of residential buildings to which the electrical power is supplied.

It is another object of the present: invention to provide a device for controlling net currents in cables supplying power to residential buildings.

The present invention finds particular utility in an electrical system for a residential building, wherein a multi-conductor cable supplies power of 60 Hz frequency to loads in the residential building from a power supply. The cable typically has a neutral conductor providing a conductive path for currents returning from the loads to the power supply. A net current may occur in the electrical system when some part of the current in the electrical system return to the power supply via alternative conductive paths different from the neutral conductor, thereby creating a power frequency magnetic field which may cause possible or alleged health effects.

According to the teachings of the present invention, a net current control device, including a ferromagnetic core, is attached to the multi-conductor cable to increase the impedance of the alternate conductive paths to the net current, thereby increasing the current flowing along the neutral conductor.

The multi-conductor cable may be wound on a ferromagnetic core, thereby forming at least one turn of the multi-conductor cable through the ferromagnetic core.

Also, if two multi-conductors cables are to be connected, a plurality of independent windings on the ferromagnetic core are provided, each having a first and a second terminal, respectively. The first terminals of the independent windings are connected to conductors of one of the two multi-conductor cables, and second terminals are connected to conductors of another multi-conductor cable.

The ferromagnetic core also can be provided with an auxiliary winding. At least two non-linear voltage-dependent impedances (diodes) connected in parallel and in opposite polarity to each other, are connected to the auxiliary winding for minimization of saturation induced voltage.

These and other objects of the present invention will become apparent from a reading of the following specification taken in conjunction with the enclosed drawings.

DETAILED DESCRIPTION OF THE INVENTION

Figure 1:
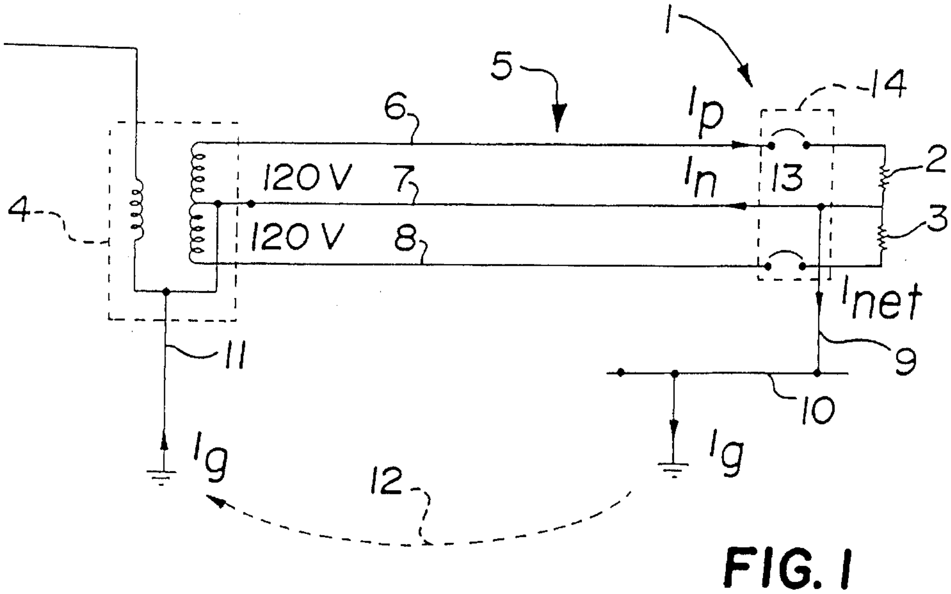
FIG. 1 PRIOR ART
FIG. 1 is a schematic diagram of an electrical system for a typical residence of the prior art.

FIG. 1 schematically shows an electrical system 1 of a typical single family residence. Electric power is supplied to 120 V (or 240 V) loads 2,3 in the system 1 from a single phase 120/240 V transformer 4 through a cable 5 including three conductors 6, 7, 8. If the 120 V loads 2, 3 in the system 1 are not evenly divided between the two 120 V conductors 6, 8 from the transformer 4, then a portion of the currents created by the unbalanced 120 V loads 2, 3 must return to the transformer 1 via the neutral conductor 7 of the cable 5, and also through any other electrically conducting paths 9, 10, 11, 12 between a neutral bus 13 of the breaker panel 14 and the transformer 4. It will be appreciated by those skilled in the art, that there can be any number of loads, and the total unbalance current in the house from all of the loads must return to the electrical system through the neutral conductor or other alternate paths.

If the neutral conductor 7 was only grounded at the transformer 4, then all return currents, due to unbalanced 120 V loads 2, 3 would return to the transformer 4 via the neutral conductor 7, and the net current in the service cable 5 would be zero. However, the neutral bus 13 of the breaker panel 14 in the system 1 is usually connected to a metallic water pipe 10, or a ground rod (not shown) for safety purposes, and a substantial amount of 120 V load 2, 3 unbalanced current may return to the transformer 4 via the water pipe 10 and electrically conducting alternate paths 12. This current is a ground current and is identified as $I_g$. The percentage of the current Is through the water pipe 10 and paths 12 is determined by the extent of the water pipe system, the impedances of any alternate paths 12, and the impedance of the neutral conductor 7. A net current $I_{net}$ is produced in the conductors 6–8 of the cable 5 as a result of the ground current $I_g$. This net current $I_{net}$ produces a significantly higher magnetic field in the vicinity of the cable 5 and inside of the residential building 1 because this magnetic field diminishes much more slowly with distance than does a magnetic field produced by the currents in the cable 5 when there is no net current $I_{net}$. $I_g$ is approximately equal to the net current flowing in the service cable shown in the simplified schematic of FIG. 1, $I_{net}$ must equal $I_g$ since there are not other paths for $I_{net}$, but in the general case there are other paths for the net current to flow, such as CCVT cables. $I_p$ is the current that is flowing in one of the energized conductors of the service cable.

Figure 2:
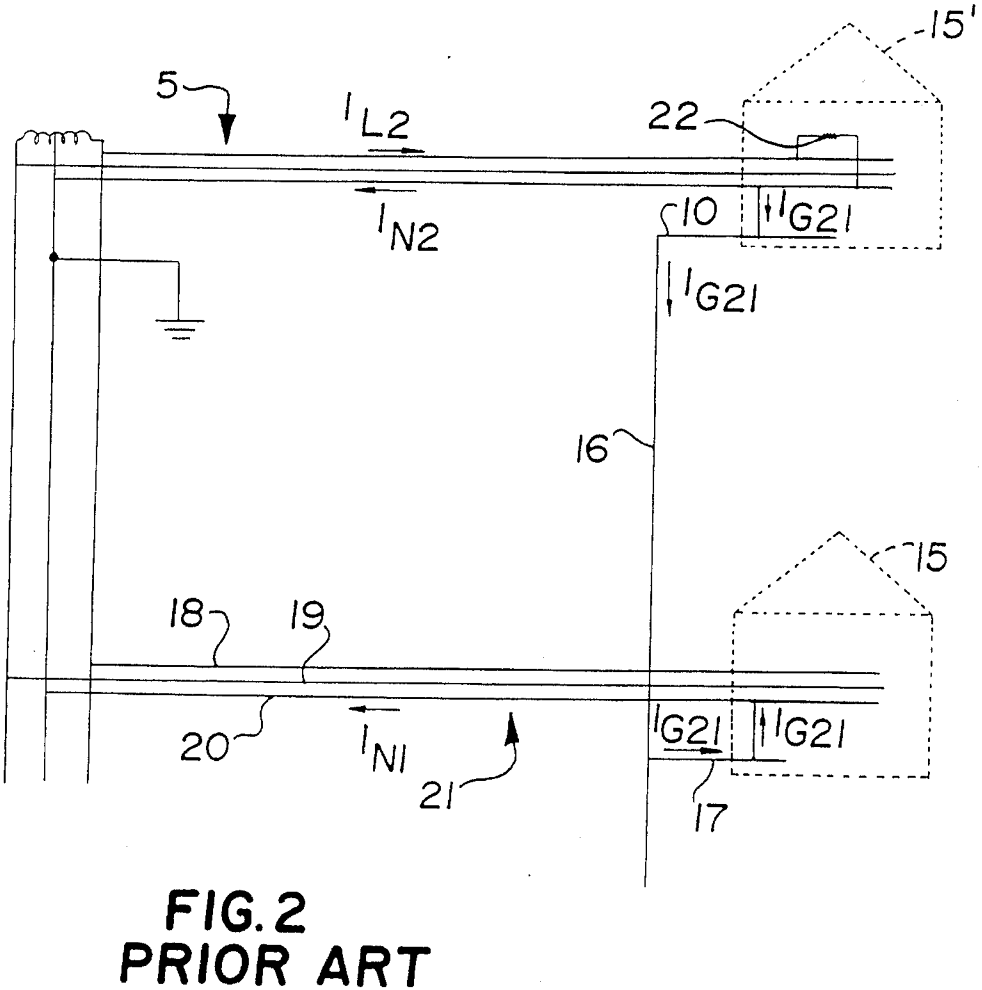
FIG. 2 PRIOR ART
FIG. 2 is a schematic diagram of an electrical system for two adjacent residences of the prior art.

As schematically shown in FIG. 2, the net current may also be produced in adjacent residential buildings 15, 15' connected to a common metallic water pipe 16. In this case, the net current may be produced in the water pipe 17 and conductors 18, 19, 20 of a service cable 21 of the residence 15 by an electrical load 22 in the adjacent residence 15'.

The current $I_{L2}$ flowing in one of the energized conductors of the service cables is equal to the current in the single load 22. $I_{N2}$ is the current returning to the service transformer in the neutral conductor of the service cables. $I_{L2}$ must be equal to $I_{N1}$ plus $I_{N2}$.

Figure 3:
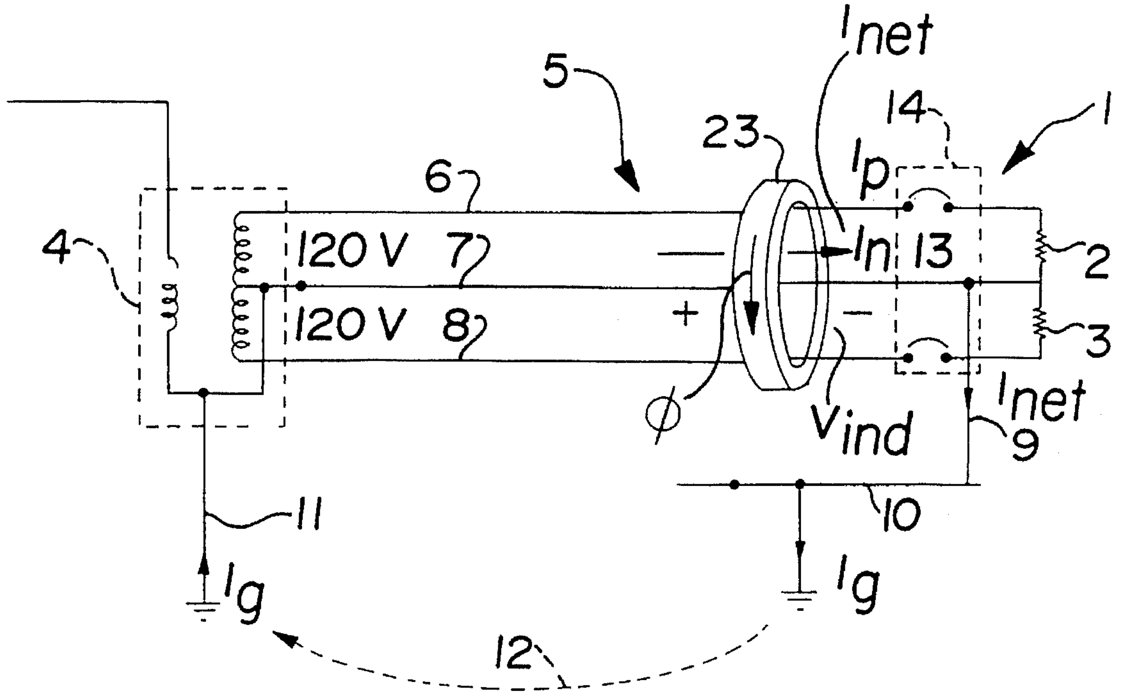
FIG. 3 is a schematic diagram of one embodiment of the invention, showing a ferromagnetic core placed around a multiple conductor cable.

With reference to FIG. 3 the net current $I_{net}$ and the resulting magnetic field may be reduced by means of a net current control device 23. Different embodiments of the net current control device are discussed in this specification. In its basic form, the net current control device 23 comprises a high permeability ferromagnetic core placed around the service cable 5. If any net current $I_{net}$ flows in the service cables, the net current $I_{net}$ magnetizes the core of the net current control device 23 thereby creating a magnetic flux ø in the core and this, in turn, induces a voltage $V_{ind}$ in each of the conductors 6–8 of the service cable 5 that opposes the flow of the net current $I_{net}$, i.e. opposes any further increases of the net current $I_{net}$. The effect of the ferromagnetic core net current control device 23 is to encourage the vector sum of the load currents to return to the service transformer 4 by means of the neutral conductor 7 in the service cable 5 rather than via alternate conductors paths 10, 11, 12.

If desired, the net current control device 23 could be placed around the grounding conductor 9. However, this in general is not as effective in reducing magnetic field values as placing the net current control device 23 around the service cable 5. This is because a core of the net current control device 23 if placed around the grounding conductor 9, would encourage net current to flow in any conductive path other than the ground conductor, while placing the net current control device 23 around the service cable 5 specifically encourages the vector sum of the load currents to flow in the neutral conductor 7. Placing the net current control device 23 around the grounding conductor 9 also is less desirable from a safety point of view because it would increase the voltage of the breaker panel ground bus 13 with respect to ground.

Referring again to FIG. 2, the net current control device placed around the service conductors 18, 19, 20 of the house 15 would reduce the net current in its water pipe 17, and the service conductors 18, 19, 20.

Figure 4:
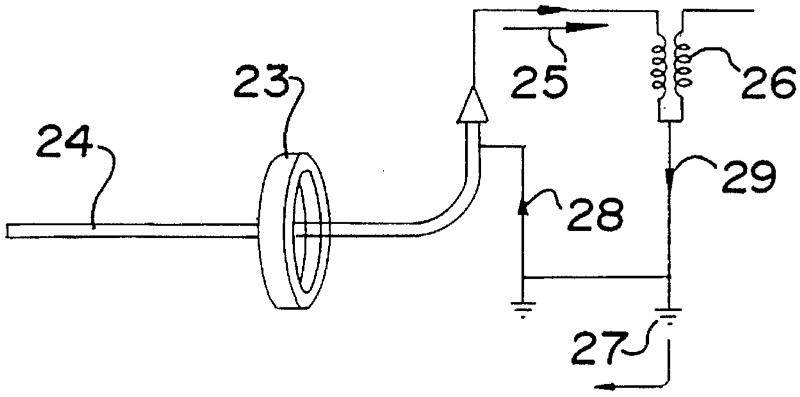
FIG. 4 is a schematic diagram of a net current control device applied to reduce the magnitude oft the net current flowing in an underground residential distribution cable.

Referring to FIG. 4, the net current control device 23 serves for reducing the net current flowing in an underground residential distribution cable 24 by encouraging load current 25 to return to its source (a distribution substation) in the concentric neutral conductors of the cable rather than alternate earth return paths. The load current 25 in the primary winding of the transformer 26 returns to the earth 27, as well as a shield and concentric neutral wire 28 of the cable 24. The net current control device 23 reduces the net current flowing in the cable 24 by encouraging the return current 29 from the primary winding of the distribution transformer 26 to return via the cable shield and neutral conductor.

Figure 5:
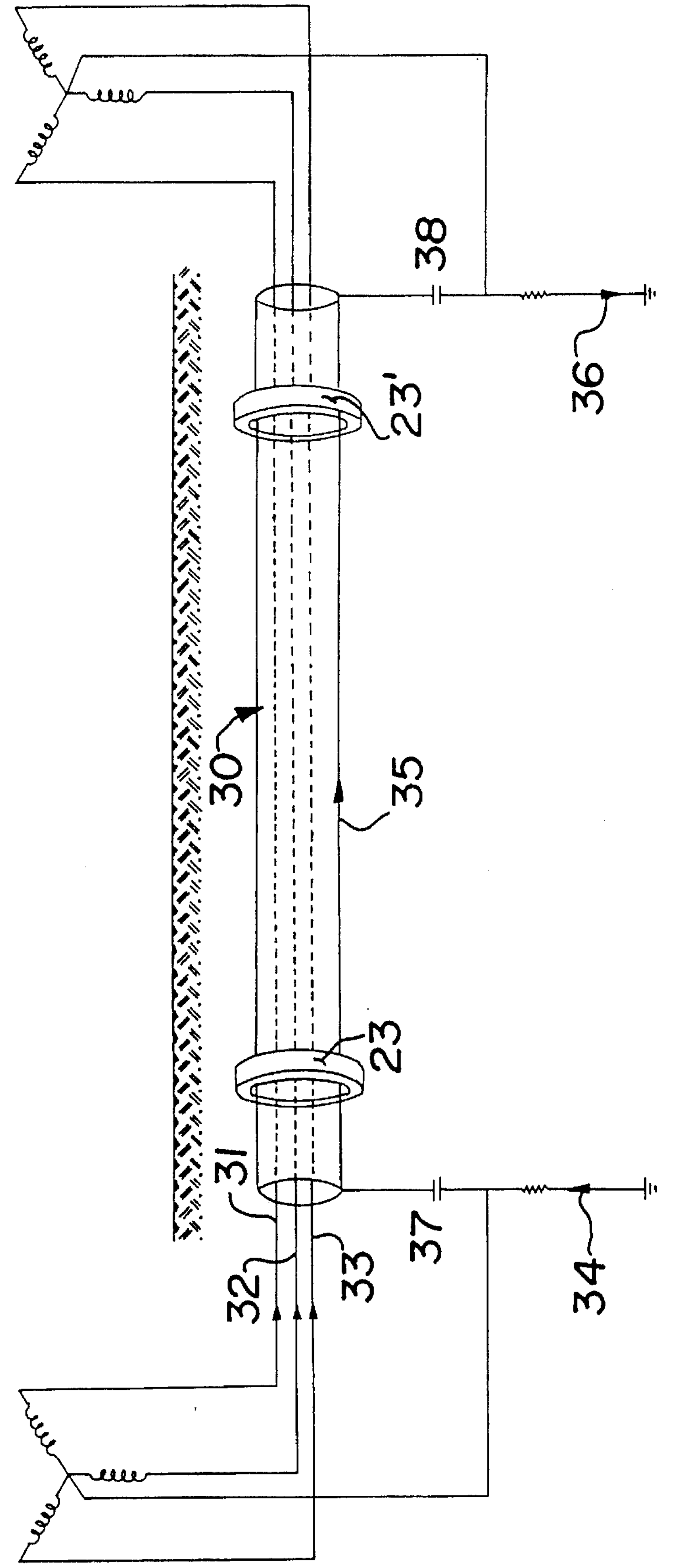
FIG. 5 is a schematic diagram showing net current devices used to reduce magnetic fields to a very low level in the vicinity of a pipe-type transmission cable.

Net current may also be caused in power transmission and distribution lines by stray and included currents as well as by load current flowing in conductive paths other than neutral conductors. FIG. 5 is an electrical schematic of a high pressure pipe-type transmission cable. Pipe-type cable systems 30, 31, 32, 33 produce low magnetic field values above the surface of the ground due to the magnetic shielding of the steel pipe 30, but stray current 34, 35, 36 flowing on the steel pipe 30 can create a net current and significantly higher magnetic field values than would otherwise be expected. The net current is the instantaneous sum of all the currents that are flowing in the high voltage conductors 31, 32, 33 that are inside of the steel pipe 30, plus the currents that are flowing on the sheaths of the three high voltage cables 31, 32, 33 inside of the steel pipe 30, plus any current (shown as stray current) that is flowing on the steel pipe 30 which encloses the three high voltage cables 31, 32, 33. Net current control devices 23, 23' electrically insulated from and placed around the steel pipe 30 will reduce the net current caused by stray currents 34, 35, 36 and allow the steel pipe 30 to be grounded at multiple points 37, 38 for safety reasons.

Figure 6:
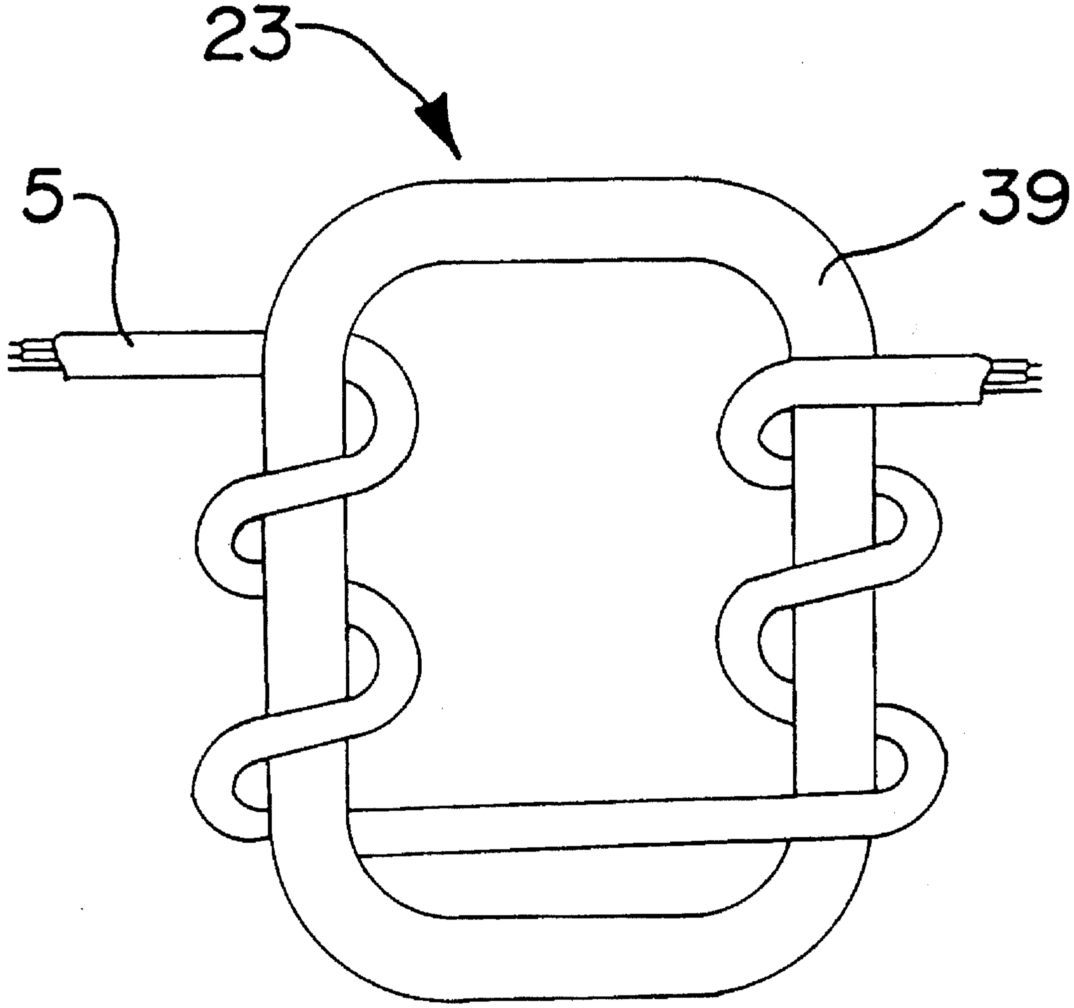
FIG. 6 is a schematic diagram showing another embodiment of a net current control device.

The net current control device 23, 23' shown in FIGS. 3, 4, 5 may be embodied as shown in FIG. 6 and includes one or more turns of a multiple conductor cable 5 on 24 wound on a high permeability ferromagnetic core 39. The core 39 is fabricated from laminated high permeability ferromagnetic materials in order to minimize eddy currents which reduce the effective permeability of the device. Multiple turns of the cable 5, 24 around the core 39 (more than four turns) result in more cost-effective devices.

However, in cases where it is only practical to use a low number of turns (one to four turns), a tape wound core with no breaks in the ferromagnetic material is required so that the performance of the net current control device is not significantly degraded at low net current values.

The following two equations determine the physical dimensions of the core 39 for particular applications.

The first design equation is:

$$E_m = 4.44\, n\, f\, A_c\, B_m\, 10^{-8} \qquad (1)$$

where $E_m$ is the maximum voltage to be induced by the net current control device (volts)

n is the number of turns of the power cable f is frequency (Hz)

$A_c$ is the cross section of the core ($cm^2$)

$B_m$ is the maximum flux density (gausses) which is material dependent. The second design equation is:

$$Z = \frac{150.8\pi\mu n^2 A_c}{10^8 l_m}$$

where:

Z is the reactive impedance (ohms)

μ is the magnetic permeability of the core material, (gausses/oersted)

n is the number of turns of the inductor $A_c$ is the cross section of the core ($cm^2$)

$l_m$ is the core mean length (cm)

The voltage, $E_m$ in equation (1) is the amount of voltage that must be induced in the conductors of the electric power cable to limit the net current to the desired value. This maximum induced voltage, $E_m$ depends on the application but, in general, is in the order of several volts, and it depends on the maximum value of the net current that would flow in the electrical cable without the net current control device and the length of the power cable.

Z in equation (2) is the minimum mutual reactive impedance that is required to limit the net current to the desired value. The magnetic permeability, μ, in equation (2) is the effective ac or impedance permeability of the material at power frequency. It is a function of the core material and the magnetizing force produced by the product of the net current and the number of turns of the electrical cable. In some applications, the combination of core cross sectional area and number of turns is determined by $E_m$. In other applications, the core cross sectional area and number of turns is determined by the required impedance, Z. The impedance, Z, must be ten to twenty times the impedance of the neutral conductor of the electrical cable to which the net current control device is applied.

In some cases, it is physically impractical to pass more than one turn of the power cable through the net current control device, such as the pipe-type transmission cable example, due to the size and stiffness of the power cable. If this is the case, then it is necessary to use special materials to fabricate the core of the net current device that have a high magnetic permeability, μ, at low magnetizing forces of 0.01 oersted or less.

Figure 7:
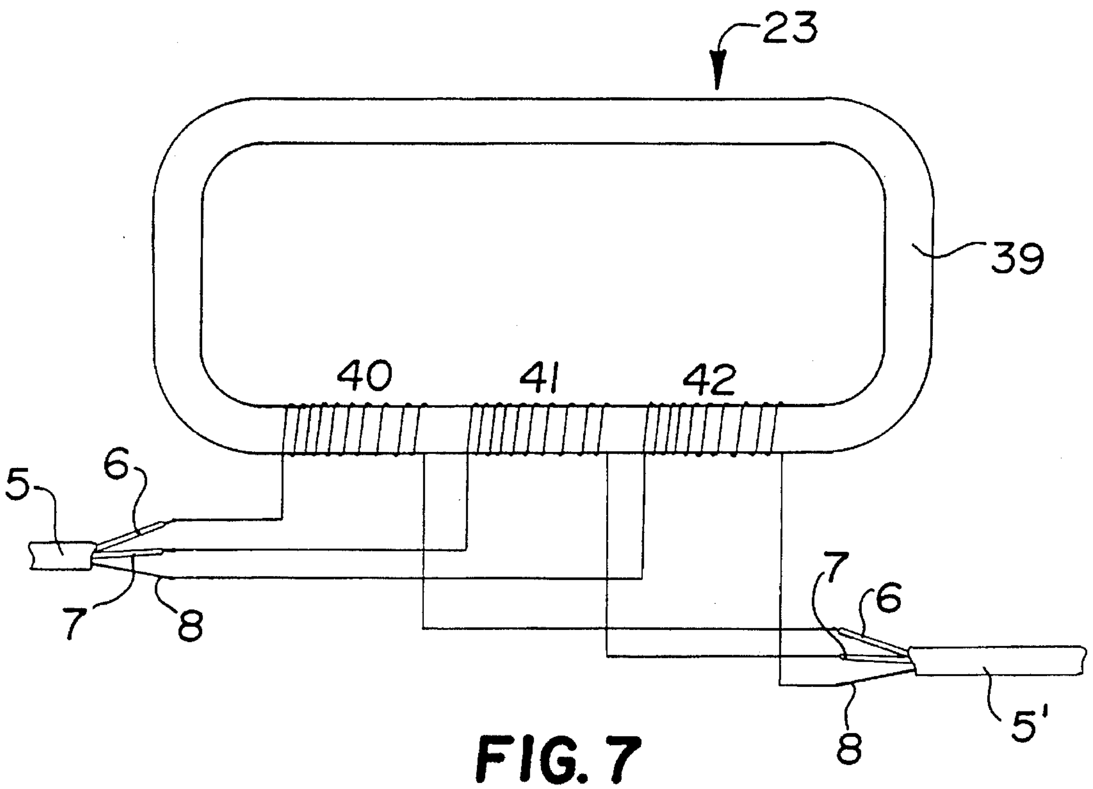
FIG. 7 is a schematic diagram showing an embodiment of a net current control device placed in series with the conductors of a cable.

Another embodiment of the net current control device is a specially designed multi-turn transformer shown in FIG. 7. In this embodiment the net current control device 23 is placed in series with a multiple conductor cable 5, 5'. This may be required if a net current control device 23 is to be installed in existing installations where there is not: enough cable to install around the high permeability core 39 as shown in FIG. 6. This embodiment is also applicable where it is desired to have a device 23 with a larger number of turns than is practical by wrapping the multi-conductor cable 5 (or 24) around a high permeability core 39 because of the dimensions or stiffness of the cable 5 (or 24). Independent windings 40, 41, 42 are provided on the ferromagnetic core 39. Respective terminals of the windings 40, 41, 42 are connected to respective conductors 6, 7, 8 in the cables 5,5'.

Figure 8:
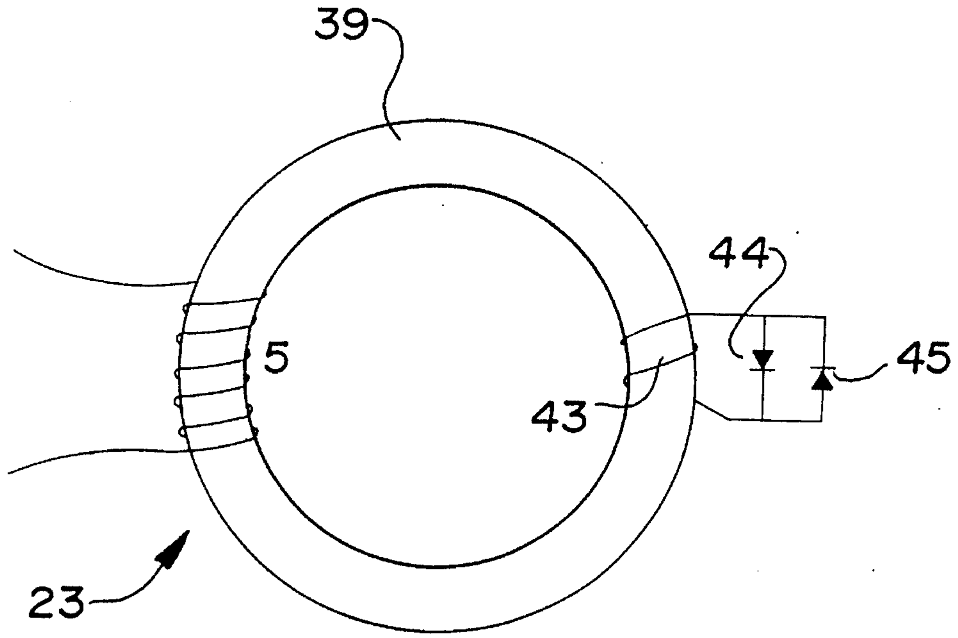
FIG. 8 is a modification to the net current device, including means for minimization of saturation induced voltage.

With reference to FIG. 8, although a ferromagnetic net current control device 23 as described in this disclosure has little effect on the voltages in the electric power system during normal conditions, one modification may be necessary to minimize core saturation induced voltages for the abnormal condition of open neutral conductors. If the neutral conductors of the electrical cable to which a net current control device 23 is applied are damaged or are disconnected from the circuit, objectionable voltages may be induced in the energized conductors of the electrical cable 5, 24.

The voltage induced in the electrical cable 5, 24 would not be sinusoidal since the core 39 would be driven into saturation twice each power frequency cycle by any unbalanced load current. The induced voltage in the electrical cable 5 (or 24) produced by the net current control device 23 would increase rapidly as the unbalanced load current passes through zero (120 times a second) up to the time that the magnetic flux (volt-second) capability of the core 39 is exceeded. At this time the induced voltage would decrease rapidly as the core saturates. These saturation voltage transients would be induced in all of the conductors that pass through the net current control device 23. The core saturation induced voltage may cause damage or disruptive interference to sensitive electronic equipment supplied by the electrical cable 5 (or 24). The magnitude and duration of these saturation voltage spikes would be determined by the construction of the ferromagnetic core 39. If the core 39 is laminated, it would be capable of inducing higher magnitude but narrower voltage spikes than would be the case for a core 39 that is not laminated or that has thicker laminations.

FIG. 8 shows a modification to the basic net current control device 23 design that will minimize or eliminate the saturation induced voltage problem if necessary. In this modified design an auxiliary winding 43 is added to the net current control device 23 and connected to silicon power diodes, 44 and 45 (or other voltage dependent nonlinear impedances) that will conduct current if the induced volts per turn of the net current control device exceeds a design value. Opposite polarity, parallel silicon power diodes are well suited for this application because of low cost and their extreme nonlinearity with applied voltage. These diodes act like an open circuit for voltages of less than 0.6 to 0.7 volts per diode. When the voltage exceeds 0.7 volts per diode, the diodes act like a short circuit and conduct a current that oppose the flux produced by the net current in the multi-conductor electrical cable 5. This induced current in winding 43 prevents the saturation voltage spikes which would otherwise be caused by large values of net current caused by faults or faulty neutral conductor(s).

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In an electrical power system for a residential building, wherein a multi-conductor cable supplies power to loads in the residential building from a power supply, said cable having a neutral conductor providing a conductive path for currents returning from said loads to the power supply, wherein a net current may occur in said electrical system, said net current being an instantaneous sum of all the currents in said electrical system returning to the power supply via alternative conductive paths different from the neutral conductor, and wherein said net current creates a power frequency magnetic field in the vicinity of and inside of the residential building, the method of reducing said power frequency magnetic field comprising the step of:

attaching a closed loop ferromagnetic core to said multi-conductor cable, thereby increasing the impedance of said alternative conductive paths to the net current, and thereby increasing the current flowing along the neutral conductor.

2. The method of claim 1, wherein the closed loop ferromagnetic core is formed from a laminated high permeability ferromagnetic material.

3. The method of claim 1, further including the step of winding the multi-conductor cable on said closed loop ferromagnetic core, thereby forming at least one turn of said multi-conductor cable through said closed loop ferromagnetic core.

4. The method of claim 1, further including the steps of:

providing a plurality of independent windings on said closed loop ferromagnetic core, each of said plurality of independent windings including a first and a second terminal, respectively, connecting said first terminals of said independent windings to respective conductors in said multi-conductor cable, providing another multi-conductor cable to be connected in series to said multi-conductor cable, and connecting said second terminals of said independent windings to respective conductors in said another multi-conductor cable.

5. The method of claim 3, further including the steps of:

providing an auxiliary winding on the closed loop ferromagnetic core, said auxiliary winding including first and second terminals, providing at least first and second non-linear voltage-dependent impedances being connected in parallel and in opposite polarity to each other, and connecting said at least first and second impedances to said first and second terminals.

6. In an electrical power system for a residential building, wherein a multi-conductor cable supplies power to loads in the residential building from a power supply, said cable having a neutral conductor providing a conductive path for currents returning from said loads to the power supply, wherein a net current may occur in said electrical system, said net current being an instantaneous sum of all the currents in said electrical system returning to the power supply via alternative conductive paths different than the neutral conductor, and wherein said net current creates a power frequency magnetic field in the vicinity of and inside of the residential building, the improvement in reducing said power frequency magnetic field, comprising a closed loop ferromagnetic core attached to said multi-conductor cable for increasing the impedance of said alternative conductive paths to the net current, thereby increasing the current flowing to the power supply via the neutral conductor.

7. The improvement of claim 6, wherein the closed loop ferromagnetic core is formed from a laminated high permeability ferromagnetic material.

8. The improvement of claim 6, wherein the multi-conductor cable is wound on said closed loop ferromagnetic core, thereby forming at least one turn of said multi-conductor cable through said closed loop ferromagnetic core.

9. The improvement of claim 6, wherein another multi-conductor cable is connected in series to said multi-conductor cable, said closed loop ferromagnetic core further including a plurality of independent windings on said closed loop ferromagnetic core, each of said plurality of independent windings including first and second terminals, respectively, said first terminals of said independent windings being connected to respective conductors in said multi-conductor cable, said second terminals of said independent windings being connected to respective conductors in said another multi-conductor cable.

10. In an electrical power system for a residential building, wherein a multi-conductor cable supplies power to loads in the residential building from a power supply, said cable having a neutral conductor providing a conductive path for currents returning from said loads to the power supply, wherein a net current may occur in said electrical system, said net current being an instantaneous sum of all the currents in said electrical system returning to the power supply via alternative conductive paths different than the neutral conductor, and wherein said net current creates a power frequency magnetic field in the vicinity of and inside of the residential building, the improvement in reducing said power frequency magnetic field, comprising a ferromagnetic core attached to said multi-conductor cable for increasing the impedance of said alternative conductive paths to the net current, thereby increasing the current flowing to the power supply via the neutral conductor, wherein the multi-conductor cable is wound on said ferromagnetic core, thereby forming at least one turn of said multi-conductor cable through said ferromagnetic core, wherein the ferromagnetic core further includes an auxiliary winding, said auxiliary winding including first and second terminals, and at least first and second non-linear voltage dependent impedances being connected in parallel and in opposite polarity to each other, said at least first and second impedances being connected to said first and second terminals.

11. The method of claim 1, wherein the closed loop ferromagnetic core embraces said multi-conductor cable.

12. The method of claim 1, wherein the closed loop ferromagnetic core is attached to said multi-conductor cable in the vicinity of the residential building.

13. The method of claim 1, further including the step of attaching another closed loop ferromagnetic core embracing said multi-conductor cable in the vicinity of said power supply.

14. The improvement of claim 6, wherein said closed loop ferromagnetic core embraces said multi-conductor cable.

15. The improvement of claim 6, wherein the closed loop ferromagnetic core is attached to said multi-conductor cable in the vicinity of said residential building.

16. The improvement of claim 6, further including another closed loop ferromagnetic core embracing said multi-conductor cable in the vicinity of said power supply.

17. In an electrical power system for a residential building, wherein a multi-conductor cable supplies power to loads in the residential building from a power supply, said cable having a neutral conductor providing a conductive path for currents returning from said loads to the power supply, wherein a net current may occur in said electrical system, said net current being an instantaneous sum of all the currents in said electrical system returning to the power supply via alternative conductive paths different than the neutral conductor, and wherein said net current creates a power frequency magnetic field in the vicinity of and inside of the residential building, the improvement in reducing said power frequency magnetic field, comprising a ferromagnetic core attached to said multi-conductor cable for increasing the impedance of said alternative conductive paths to the net current, thereby increasing the current flowing to the power supply via the neutral conductor, wherein an auxiliary winding is wound on the ferromagnetic core, the auxiliary winding having first and second terminals, respectively, and wherein at least first and second non-linear voltage dependent impedances are connected in parallel and in opposite polarity to each other, said at least first and second impedances being connected to said first and second terminals, respectively.

18. In an electrical power system for a building, wherein a multi-conductor cable supplies power to loads in the building from a power supply, said cable having a neutral conductor providing a conductive path for currents returning from said loads to the power supply, wherein a net current may occur in said electrical system, said net current being an instantaneous sum of all the currents in said electrical system returning to the power supply via alternative conductive paths different from the neutral conductor, and wherein said net current creates a power frequency magnetic field in the vicinity of and inside of the building, the method of reducing said power frequency magnetic field comprising the step of:

attaching a closed loop ferromagnetic core along said multi-conductor cable for controlling said alternative conductive paths, thereby increasing the impedance of said alternative conductive paths of said building to the net current, and thereby increasing the current flowing along the neutral conductor.

* * * * *